(12) United States Patent
Park et al.

(10) Patent No.: US 9,063,328 B2
(45) Date of Patent: Jun. 23, 2015

(54) HEAD-UP DISPLAY APPARATUS AND METHOD FOR VEHICLE

(71) Applicant: Electronics and Telecommunications Research Institute, Daejeon (KR)

(72) Inventors: Hye-Sun Park, Daejeon (KR); Chang-Rak Yoon, Daejoon (KR); Seong-Yun Cho, Daejeon (KR); Jae-Hong Oh, Daejeon (KR); Kyong-Ho Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 177 days.

(21) Appl. No.: 13/947,085

(22) Filed: Jul. 21, 2013

(65) Prior Publication Data

US 2014/0211319 A1 Jul. 31, 2014

(30) Foreign Application Priority Data

Jan. 28, 2013 (KR) .................. 10-2013-0009511

(51) Int. Cl.
*G02B 27/14* (2006.01)
*G02B 27/01* (2006.01)

(52) U.S. Cl.
CPC ........ *G02B 27/01* (2013.01); *G02B 2027/0118* (2013.01); *G02B 2027/014* (2013.01); *G02B 2027/0187* (2013.01)

(58) Field of Classification Search
USPC .................................. 359/630, 900
See application file for complete search history.

(56) References Cited

U.S. PATENT DOCUMENTS

| | | |
|---|---|---|
| 2004/0150515 A1 | 8/2004 | Kallhamer |
| 2012/0235805 A1 | 9/2012 | Nogami et al. |

FOREIGN PATENT DOCUMENTS

| | | |
|---|---|---|
| KR | 10-2011-0016118 | 2/2011 |
| KR | 10-2012-0059304 | 6/2012 |
| WO | 2011/070783 | 6/2011 |

*Primary Examiner* — Jack Dinh
(74) *Attorney, Agent, or Firm* — Kile Park Reed & Houtteman PLLC

(57) ABSTRACT

Disclosed herein is a head-up display apparatus for a vehicle. The head-up display includes an information analysis unit, a first information determination unit, a second information determination unit, and an information display unit. The information analysis unit collects vehicle state information, driver state information, driving environment state information, driver gaze information, individual characteristic information and common characteristic information from a plurality of information collection units, and analyzes the collected information. The first information determination unit prioritizes the vehicle state information, the driver state information, and the driving environment state information. The second information determination unit determines a driver's field of view based on driver field of view information and driver individual and common characteristic information. The information display unit changes information to be displayed to the driver based on priorities and the driver's field of view, and then displays the changed information.

16 Claims, 6 Drawing Sheets

HEAD-UP DISPLAY APPARATUS AND METHOD FOR VEHICLE

CROSS REFERENCE TO RELATED APPLICATION

This application claims the benefit of Korean Patent Application No. 10-2013-0009511, filed Jan. 28, 2013, which is hereby incorporated by reference in its entirety into this application.

BACKGROUND OF THE INVENTION

1. Technical Field

The present invention relates generally to a head-up display apparatus and method for a vehicle and, more particularly, to a head-up display apparatus and method for a vehicle, which divide a driver's field of view into a field of view and an adjacent field of view, analyze information collected within the two fields of view, and display the analyzed information to a driver in descending order of priorities.

2. Description of the Related Art

In general, side-view mirrors and a rear-view mirror are chiefly used to check roads and view other vehicles outside a vehicle. In conventional methods using the mirrors, it is difficult to intuitively determine influences on a driver's forward gaze and the position, distance, speed and direction of a vehicle being driven in relation to those of another vehicle. Furthermore, it is sometimes difficult for a driver to see a vehicle in his/her "blind spot" because of the angle of a mirror.

For this reason, a method using a head-up display apparatus was developed. The head-up display apparatus is an apparatus that is designed to display vehicle information and driving information to a driver via a wind shield placed in front of a driver in order to minimize the movement of the driver's field of view and prevent the driver's forward attention from being distracted while driving.

However, the head-up display apparatus is limited in terms of the level of safety it provides to a driver because it displays only simple driving information (e.g., driving speed, the RPM of an engine, and the amount of fuel) and real-world information (e.g., roads, buildings, and vehicles) within a forward field of view, but does not provide information, such as the distance between a driven vehicle and a vehicle behind the driven vehicle, when lanes are changed. Such distance information is required by an inexperienced driver or an unskilled driver. Furthermore, the head-up display apparatus is problematic in that it deteriorates a driver's recognition ability because it frequently provides incorrect information about environments in a forward direction.

The head-up display apparatus to which 3-D graphics have been applied can improve a driver's recognition ability by displaying driving information in and around a driver's field of view in accordance with real-world information. However, the head-up display apparatus is problematic in that it is difficult to precisely display information suitable for a driver's gaze because the driver's field of view varies depending on the characteristics of the driver and driving circumstances.

SUMMARY OF THE INVENTION

Accordingly, the present invention has been made keeping in mind the above problems occurring in the prior art, and an object of the present invention is to provide a head-up display apparatus and method for a vehicle, which divide a driver's field of view into a field of view and an adjacent field of view while taking the characteristics of the driver, driving circumstances, and various surrounding environments into consideration, and display information collected within the two fields of view, thereby providing the entire information generated within the driver's field of view to the driver.

Another object of the present invention is to provide a head-up display apparatus and method for a vehicle, which analyze collected information and display the analyzed information to a driver in descending order of priorities, thereby assisting the driver to drive safely.

Yet another object of the present invention is to provide a head-up display apparatus and method for a vehicle, which represent displayed information in the form of figures, characters, or a change in color so that a driver can easily recognize the displayed information, thereby improving a driver's recognition ability.

Yet further another object of the present invention is to provide a head-up display apparatus and method for a vehicle, which represent displayed information in the form of an alarm or a visual change so that a driver can be prompted to adjust his or her field of view when information is generated within the driver's adjacent field of view, thereby enabling the driver to adjust his/her field of view easily and rapidly.

In accordance with an aspect of the present invention, there is provided a head-up display apparatus for a vehicle, including an information analysis unit configured to collect vehicle state information, driver state information, driving environment state information, driver gaze information, individual characteristic information and common characteristic information from a plurality of information collection units attached to the vehicle, and to analyze the collected information; a first information determination unit configured to prioritize the vehicle state information, the driver state information, and the driving environment state information; a second information determination unit configured to determine a driver's field of view based on driver field of view information and driver individual and common characteristic information; and an information display unit configured to change information to be displayed to the driver based on priorities and the driver's field of view, and to display the changed information.

The information analysis unit may include a vehicle information collection unit configured to collect the vehicle state information; a vehicle information analysis unit configured to analyze a position, direction, and speed of the vehicle based on the vehicle state information collected by the vehicle information collection unit; a driver information collection unit configured to collect the driver state information; a driver information analysis unit configured to analyze a behavior, degree of fatigue and degree of concentration of the driver based on the driver state information collected by the driver information collection unit; a driving environment information collection unit configured to collect the driving environment state information; a driving environment information analysis unit configured to analyze brightness, temperature, and presence or absence of an object near the vehicle based on the driving environment state information collected by the driving environment information collection unit; a driver gaze information collection unit configured to collect the driver gaze information; and a driver gaze information analysis unit configured to analyze a direction of the driver's head, a size and position of the driver's pupils, and a number of eye blinks based on the driver gaze information collected by the driver gaze information collection unit.

The information analysis unit may include a driver individual characteristic information collection unit configured to collect the driver individual characteristic information; a driver common characteristic information collection unit configured to collect the driver common characteristic information; and a driver field of view analysis unit configured to analyze the driver's angle of view, the driver's visible distance, and the driver's cumulative gaze range by analyzing the driver individual and common characteristic information.

The driver individual characteristic information may include any one of the driver's angle of view and the driver's faculty of vision; and the driver individual and common characteristic information may include any one of age, gender, and driving experience of the driver.

The first information determination unit may include a priority assignment unit configured to assign priorities to the vehicle state information, the driver state information, and the driving environment state information based on a previously constructed database; and a priority determination unit configured to determine order in which information will be displayed in descending order of priorities.

The second information determination unit may include a driver degree of concentration extraction unit configured to extract information about a degree of concentration of the driver based on the driver gaze information; a driver focal range extraction unit configured to extract information about a focal range of the driver based on the driver individual and common characteristic information; and a driver field of view determination unit configured to determine the driver's field of view based on the information about the degree of concentration of the driver and the information about the focal range of the driver.

The driver's field of view may be divided into a field of view being closely observed by the driver and an adjacent field of view.

The information display unit may include a recognition enhancement setting unit configured to configure information to be displayed to the driver according to a recognition enhancement method based on the priorities and the driver's field of view; a recognition enhancement display unit configured to display the information to the driver while applying the recognition enhancement method employed by the recognition enhancement setting unit; a gaze guidance setting unit configured to set a method of prompting a driver to adjust a direction of his or her gaze based on the priorities and the driver's field of view; and a gaze guidance display unit configured to prompt the driver to adjust a direction of his or her gaze using the method of prompting the driver to adjust the direction of his or her gaze set by the gaze guidance setting unit, and to then display the information to the driver.

The recognition enhancement method may change any one of a color, form, size, format and degree of transparency of the information to be displayed.

The method of prompting the driver to adjust the direction of his/her gaze changes any one of an alarm, a size, and a degree of transparency, thereby prompting the driver to adjust the driver's field of view.

In accordance with an aspect of the present invention, there is provided a head-up display method for a vehicle, including collecting, by an information analysis unit, vehicle state information, driver state information, driving environment state information, driver gaze information, individual characteristic information and common characteristic information from a plurality of information collection units attached to the vehicle, and analyzing, by an information analysis unit, the collected information; prioritizing, by a first information determination unit, the vehicle state information, the driver state information, and the driving environment state information; determining, by a second information determination unit, a driver's field of view based on driver field of view information and individual and common characteristic information; and changing, by an information display unit, information to be displayed to the driver based on the priorities and the driver's field of view, and displaying, by an information display unit, the changed information.

Collecting and analyzing the information may include collecting the vehicle state information, and analyzing a position, direction, and speed of the vehicle based on the vehicle state information; collecting the driver state information, and analyzing behavior, degree of fatigue, and degree of concentration of the driver based on the driver state information; collecting the driving environment state information, and analyzing brightness, temperature, and presence or absence of an object near the vehicle based on the driving environment state information; collecting the driver gaze information, and analyzing a direction of the driver's head, a size and position of the driver's pupils, and a number of eye blinks based on the driver gaze information; and collecting the driver individual and common characteristic information, and analyzing the driver's angle of view, the driver's visible distance, and the driver's cumulative gaze range by analyzing the driver individual and common characteristic information.

Prioritizing may include assigning the priorities to the vehicle state information, the driver state information, and the driving environment state information based on a previously constructed database, and determining order in which information will be displayed in descending order of priorities.

Determining the driver's field of view may include extracting information about the degree of concentration of the driver based on the driver gaze information, extracting information about a focal range of the driver based on the driver individual and common characteristic information, and determining the driver's field of view based on the information about the degree of concentration of the driver and the information about the focal range of the driver.

The driver's field of view may be divided into a field of view being closely observed by the driver and an adjacent field of view.

Changing and displaying the information may include displaying information to the driver while applying a recognition enhancement method to the information to be displayed based on the priorities and the driver's field of view; and prompting the driver to adjust a direction of his/her gaze by applying a method of prompting the driver to adjust the direction of the driver's gaze based on the priorities and the driver's field of view, and then displaying the information to the driver.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
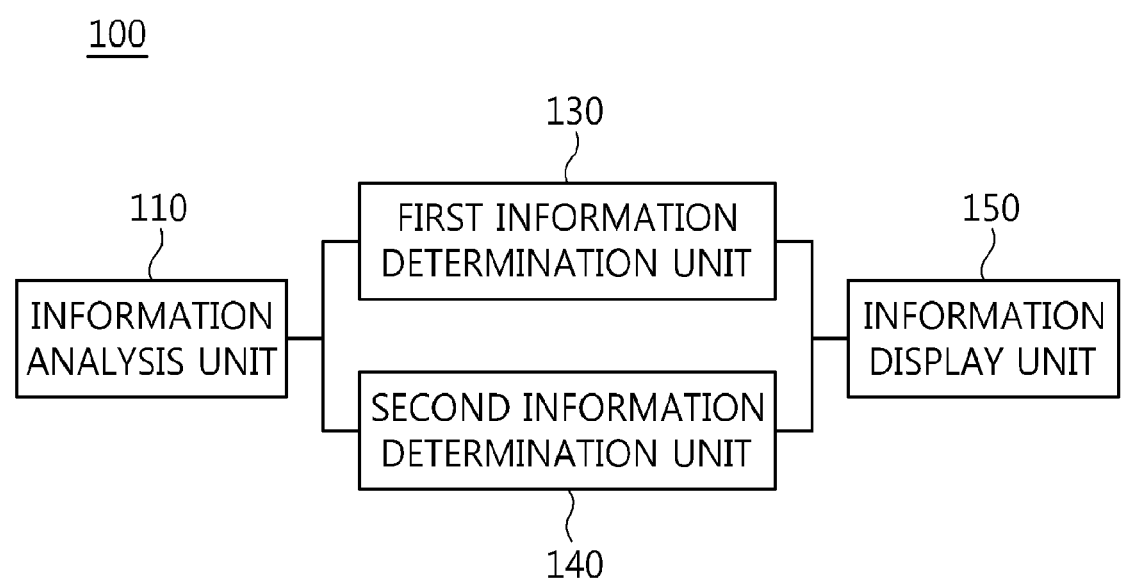
FIG. 1 is a diagram illustrating the schematic setting of a head-up display apparatus for a vehicle according to an embodiment of the present invention.

Embodiments of the present invention will be described with reference to the accompanying drawings in order to describe the present invention in detail so that those having ordinary knowledge in the technical field to which the present pertains can easily practice the present invention. It should be noted that like reference numerals are used to designate like elements throughout the drawings as far as possible. In the following description of the present invention, detailed descriptions of known functions and constructions which are deemed to make the gist of the present invention obscure will be omitted.

A head-up display apparatus and method for a vehicle according to embodiments of the present invention will be described in detail below with reference to the accompanying drawings.

The head-up display apparatus for a vehicle according to the present invention displays various pieces of information to a driver via a wind shield based on an augmented reality head-up display. More particularly, in the present invention, information is divided into augmented information within a driver's field of view and augmented information within an adjacent field of view, and the augmented information is displayed in accordance with driving circumstances in descending order of priorities. Meanwhile, a driver's gaze described in the present invention commonly refers to a line that connects an observed object and the eye, and a field of view refers to a range that a driver can see without moving his or her eye when he or she observes a point.

Figure 2:
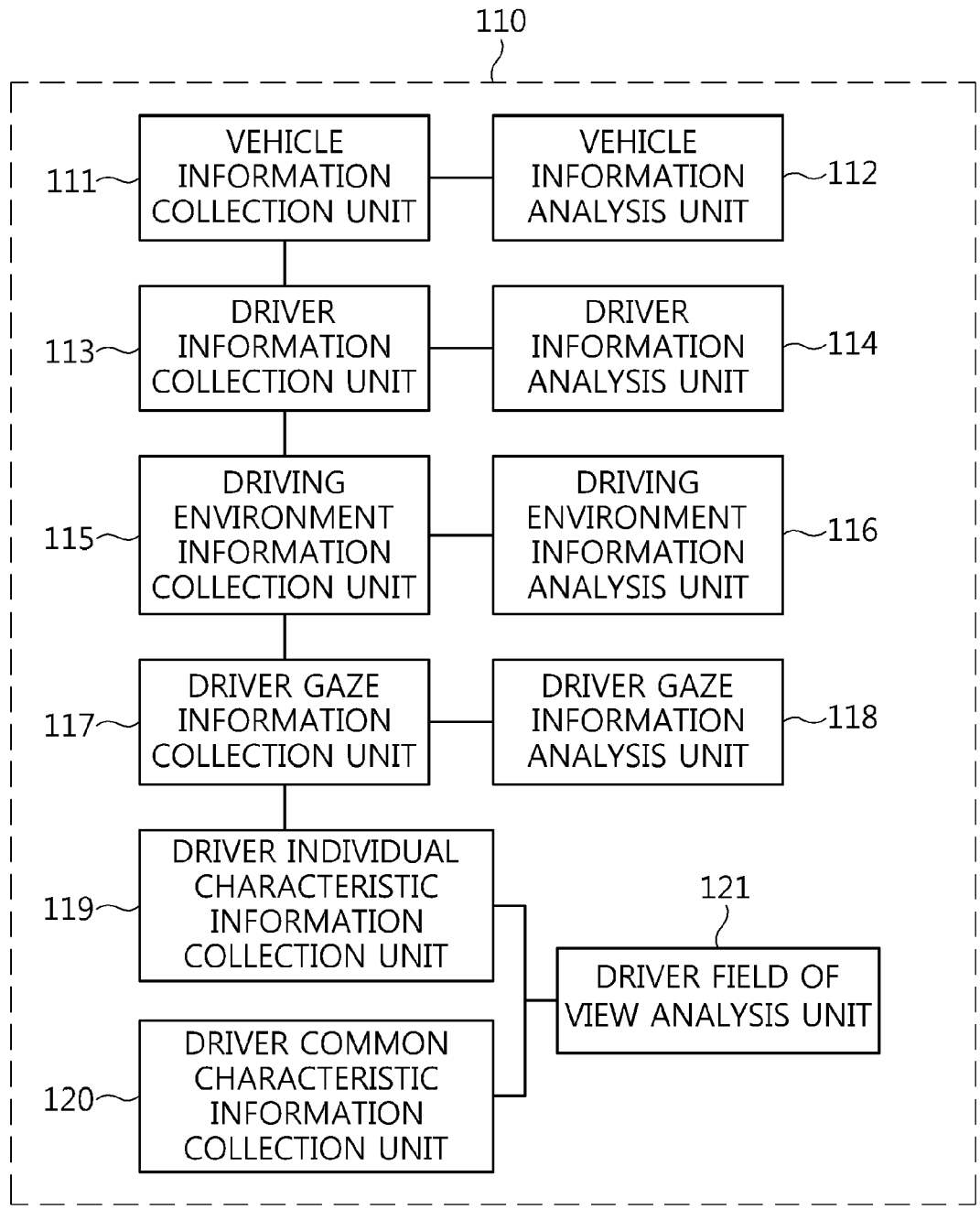
FIG. 2 is a diagram illustrating the detailed setting of an information analysis unit adopted in the head-up display apparatus for a vehicle according to an embodiment of the present invention.
Figure 3:
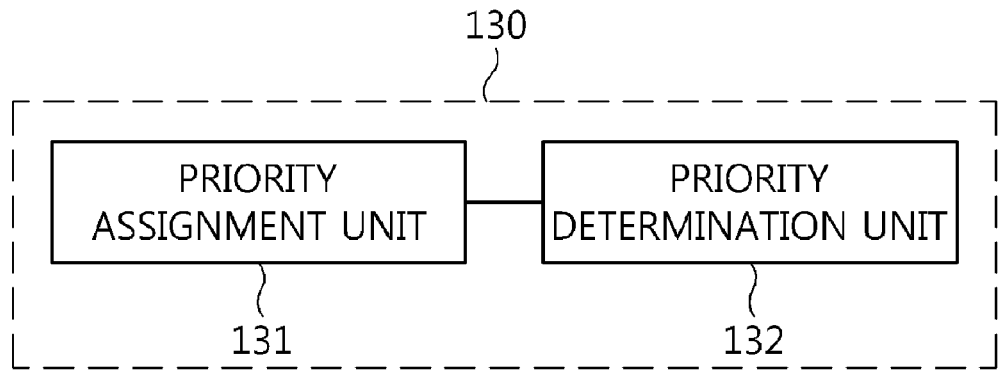
FIG. 3 is a diagram illustrating the detailed setting of a priority determination unit adopted in the head-up display apparatus for a vehicle according to an embodiment of the present invention.
Figure 4:
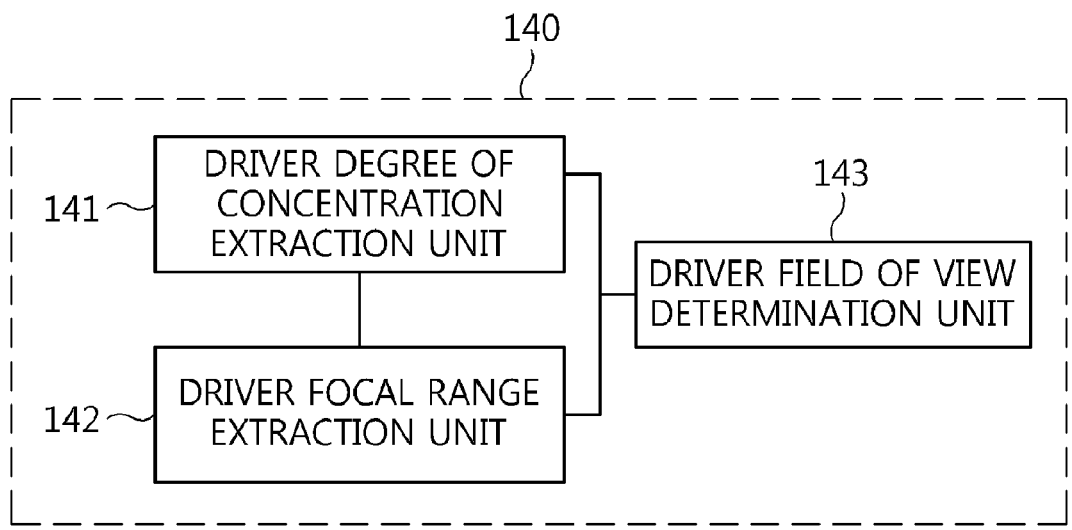
FIG. 4 is a diagram illustrating the detailed setting of a field of view determination unit adopted in the head-up display apparatus for a vehicle according to an embodiment of the present invention.
Figure 5:
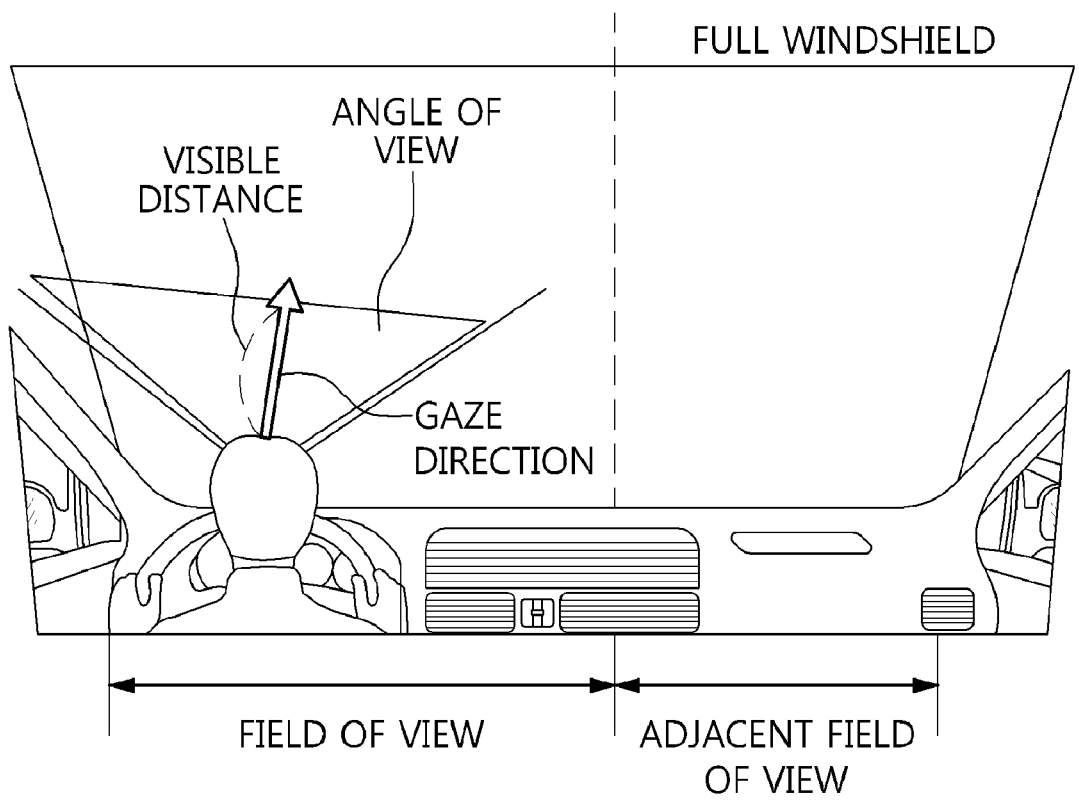
FIG. 5 is a diagram illustrating a driver's fields of view that are divided by the field of view determination unit of FIG. 4.

FIG. 1 is a diagram illustrating the schematic setting of a head-up display apparatus for a vehicle according to an embodiment of the present invention, FIG. 2 is a diagram illustrating the detailed setting of an information analysis unit adopted in the head-up display apparatus for a vehicle according to an embodiment of the present invention, FIG. 3 is a diagram illustrating the detailed setting of a priority determination unit adopted in the head-up display apparatus for a vehicle according to an embodiment of the present invention, FIG. 4 is a diagram illustrating the detailed setting of a field of view determination unit adopted in the head-up display apparatus for a vehicle according to an embodiment of the present invention, and FIG. 5 is a diagram illustrating a driver's fields of view that are divided by the field of view determination unit of FIG. 4.

Referring to FIG. 1, the head-up display apparatus 100 for a vehicle according to the present invention basically includes an information analysis unit 110, a first information determination unit 130, a second information determination unit 140, and an information display unit 150.

The information analysis unit 110 collects vehicle state information, driver state information, driving state information, and driver gaze information from a plurality of information collection units attached to the vehicle in order to display the information in line with a driver's gaze, and then analyzes the collected information.

For this purpose, the information analysis unit 110, as shown in FIG. 2, includes a vehicle information collection unit 111, a vehicle information analysis unit 112, a driver information collection unit 113, a driver information analysis unit 114, a driving environment information collection unit 115, a driving environment information analysis unit 116, a driver gaze information collection unit 117, and a driver gaze information analysis unit 118.

The vehicle information collection unit 111 collects vehicle state information from a plurality of collection modules which may include a Global Positioning System (GPS), an Inertial Measurement Unit (IMU), a gyro sensor, and a speed sensor.

The vehicle information analysis unit 112 analyzes states, such as the position, direction, and speed of the vehicle, based on the vehicle state information collected by the vehicle information collection unit 111.

The driver information collection unit 113 collects driver state information from a plurality of collection modules which may include a camera for photographing a driver and a heat sensor.

The driver information analysis unit 114 analyzes the states of a driver, that is, the degree of fatigue and the degree of concentration, based on the driver state information collected by the driver information collection unit 113.

The driving environment information collection unit 115 collects driving environment state information from a plurality of collection modules which may include a camera for photographing the outside of the vehicle, a temperature sensor, a brightness sensor, a reflectance sensor, a shock sensor, and a heat sensor.

The driving environment information analysis unit 116 analyzes states, such as the surrounding environment of the vehicle, that is, surrounding brightness and temperature, and states, such as the presence or absence of another vehicle, the presence or absence of an obstacle, and the presence or absence of a pedestrian near the vehicle, based on the driving environment state information collected by the driving environment information collection unit 115. Furthermore, the driving environment information analysis unit 116 may analyze road state information via communication between previously constructed map information and a road infrastructure where the vehicle is located.

The driver gaze information collection unit 117 collects driver gaze information from a plurality of collection modules which may include cameras for photographing a driver and/or eye trackers.

The driver gaze information analysis unit 118 analyzes a driver's gaze, that is, information, such as the direction of a driver's head, the size and position of the driver's pupils and the number of eye blinks, based on the driver gaze information collected by the driver gaze information collection unit 117.

Furthermore, the information analysis unit 110 collects and analyzes information about the driver's individual and common characteristics.

For this purpose, the information analysis unit 110, as shown in FIG. 2, includes a driver individual characteristic information collection unit 119, a driver common characteristic information collection unit 120, and a driver field of view analysis unit 121.

The driver individual characteristic information collection unit 119 collects information about the driver's individual characteristics. The driver individual characteristic information collection unit 119 collects individual characteristic information unique to a driver, such as the angle of view and faculty of vision of the driver, via a test using an analysis system (not shown) mounted on the vehicle based on a database constructed through questionnaires and previous experiments.

The driver common characteristic information collection unit 120 collects information about the driver's common characteristics. The driver common characteristic information collection unit 120 collects information about the driver's common characteristics, such as the driver's age, gender and driving experience, via a test using an analysis system (not shown) mounted on the vehicle based on a database constructed through previously statistically analyzed data or experiments.

The driver field of view analysis unit 121 analyzes field of view information, including information about a driver's angle of view, visible distance and cumulative gaze range, based on the individual characteristic information and the common characteristic information collected by the driver individual characteristic information collection unit 119 and the driver common characteristic information collection unit 120.

The first information determination unit 130 prioritizes the vehicle state information, the driver state information, and the driving environment state information analyzed by the information analysis unit 110.

For this purpose, the first information determination unit 130, as shown in FIG. 3, includes a priority assignment unit 131 and a priority determination unit 132.

The priority assignment unit 131 assigns priorities to the analyzed vehicle state information, driver state information, and driving environment state information based on a database previously constructed by examining the unique characteristics of the vehicle state information, the driver state information and the driving environment state information. In this case, the unique characteristics mean the timeliness of information indicating that the transfer of the information is meaningful only when the information is delivered to a driver at the current time.

The priority determination unit 132 determines the order in which information will be displayed based on the priorities which have been assigned by the priority assignment unit 131.

The second information determination unit 140 determines the driver's field of view based on information about the driver's gaze direction and individual and common characteristic information which have been analyzed by the information analysis unit 110.

For this purpose, the second information determination unit 140, as shown in FIG. 4, includes a driver degree of concentration extraction unit 141, a driver focal range extraction unit 142, and a driver field of view determination unit 143.

The driver degree of concentration extraction unit 141 extracts information about a driver's degree of concentration based on the driver gaze information, such as the gaze direction of the driver, the enlargement or reduction of the pupils, and number of eye blinks of the driver, which have been analyzed by the driver gaze information analysis unit 118.

The driver focal range extraction unit 142 extracts information about the focal range of a driver based on the driver's angle of view, the driver's visible distance, and the driver's cumulative gaze range which have been analyzed by the driver field of view analysis unit 121.

The driver field of view determination unit 143 determines a driver's field of view based on information about the degree of concentration of the driver and information about the focal range of the driver extracted by the driver degree of concentration extraction unit 141 and the driver focal range extraction unit 142. That is, the driver field of view determination unit 143 divides a driver's field of view into a field of view being closely observed by the driver and an adjacent field of view, as shown in FIG. 5. As shown in this drawing, if it is assumed that the driver is looking in a forward direction, the right side of the driver is within the range of the driver's gaze, it is not within the field of view that is being closely observed by the driver.

Accordingly, the driver's angle of view and visible distance may be extracted based on the driver's gaze direction, and the extracted range may be divided into the driver's field of view and the adjacent field of view (including a non-field of view).

The information display unit 150 changes information to be displayed to a driver so that the driver can easily recognize the changed information based on the determined priorities and driver's field of view, and displays the changed information.

Figure 6:
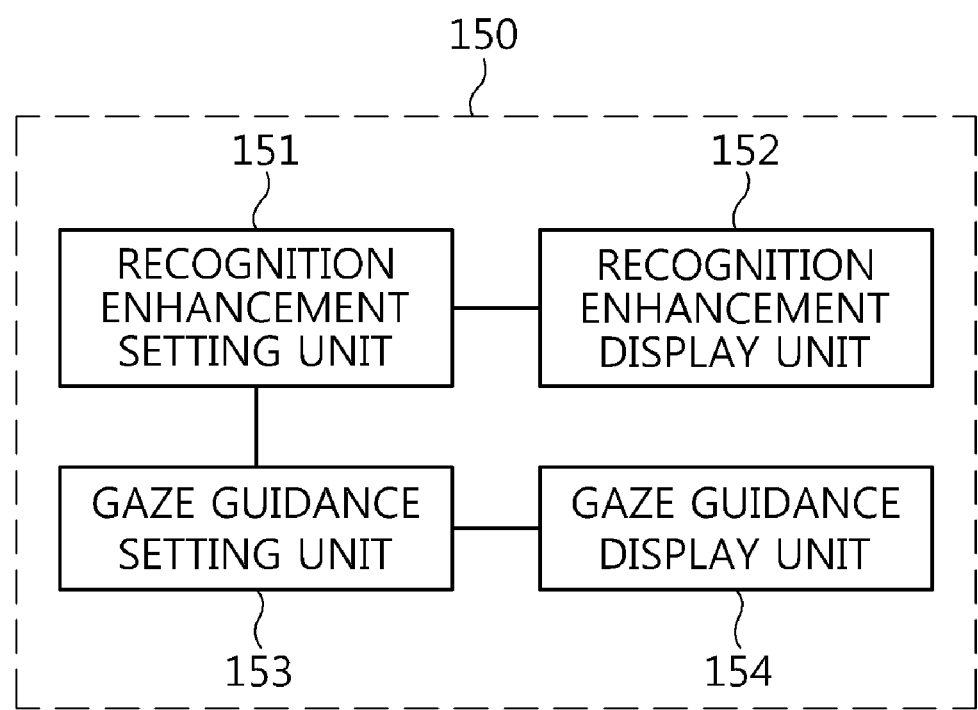
FIG. 6 is a diagram illustrating the detailed setting of an information display unit adopted in the head-up display apparatus for a vehicle according to an embodiment of the present invention.

For this purpose, the information display unit 150, as shown in FIG. 6, includes a recognition enhancement setting unit 151, a recognition enhancement display unit 152, a gaze guidance setting unit 153, and a gaze guidance display unit 154.

The recognition enhancement setting unit 151 sets a recognition enhancement method for information to be displayed to a driver based on the determined driver's field of view and priorities. That is, if information to be displayed to a driver is information within a field of view being closely observed by the driver, the recognition enhancement setting unit 151 sets the information to be displayed according to a representation method, such as a method of displaying figures or characters, so that the driver can easily recognize the displayed information. Meanwhile, if information to be displayed to a driver is information within an adjacent field of view, the recognition enhancement setting unit 151 sets the displayed information according to a representation method, such as a method of generating a change in color, so that the driver can easily recognize the displayed information even without causing the driver to adjust his or her field of view.

The recognition enhancement setting unit 151 may change the form of representation, such as a color, a form, a size, a format (e.g., characters, numbers, and figures), and the degree of transparency, to information to be displayed so that the driver can recognize the displayed information more rapidly and precisely, thereby improving the readability of the information and the understanding and satisfaction of the driver. For this purpose, the recognition enhancement setting unit 151 may obtain the correlations between driving speeds and surroundings, and may construct a database for the most recognizable enhancement representation methods by taking the driver's field of view and priorities of the information into consideration depending on circumstances. In this case, the database may estimate the recognition reaction of the driver after providing information to the driver, and may perform automatic updating based on an estimated value.

The recognition enhancement display unit 152 displays information to the driver using the recognition enhancement method set by the recognition enhancement setting unit 151.

The gaze guidance setting unit 153 sets a method of prompting a driver to adjust the direction of his or her gaze based on the determined driver's field of view and the determined priorities. That is, if information to be displayed to the driver is not information within a field of view being closely observed by the driver, the gaze guidance setting unit 153 may set the information to be displayed according to a representation method, such as a method of generating an alarm or a visual change, in order to prompt the driver to adjust the direction of his/her gaze accordingly.

The gaze guidance setting unit 153 may use a representation method, such as a method of generating an arrow, sound, blinks, or a change in size or the degree of transparency, in order to prompt the driver to adjust the direction of his or her gaze more rapidly and precisely. For this purpose, the gaze guidance setting unit 153 may determine the adjusting of the direction of the driver's gaze by taking a driver's field of view and priorities of the information into consideration, and may then construct a database for a fastest gaze adjusting representation method. In this case, the database may estimate an actual field of view change reaction and a recognition reaction in a new field of view after the direction of the driver's gaze has been adjusted to the new field of view, and may perform automatic updating based on an estimated value.

The gaze guidance display unit 154 prompts the driver to adjust the direction of the driver's gaze using the method of prompting the driver to adjust the direction of his or her gaze set by the gaze guidance setting unit 153, and then displays information to the driver.

Figure 7:
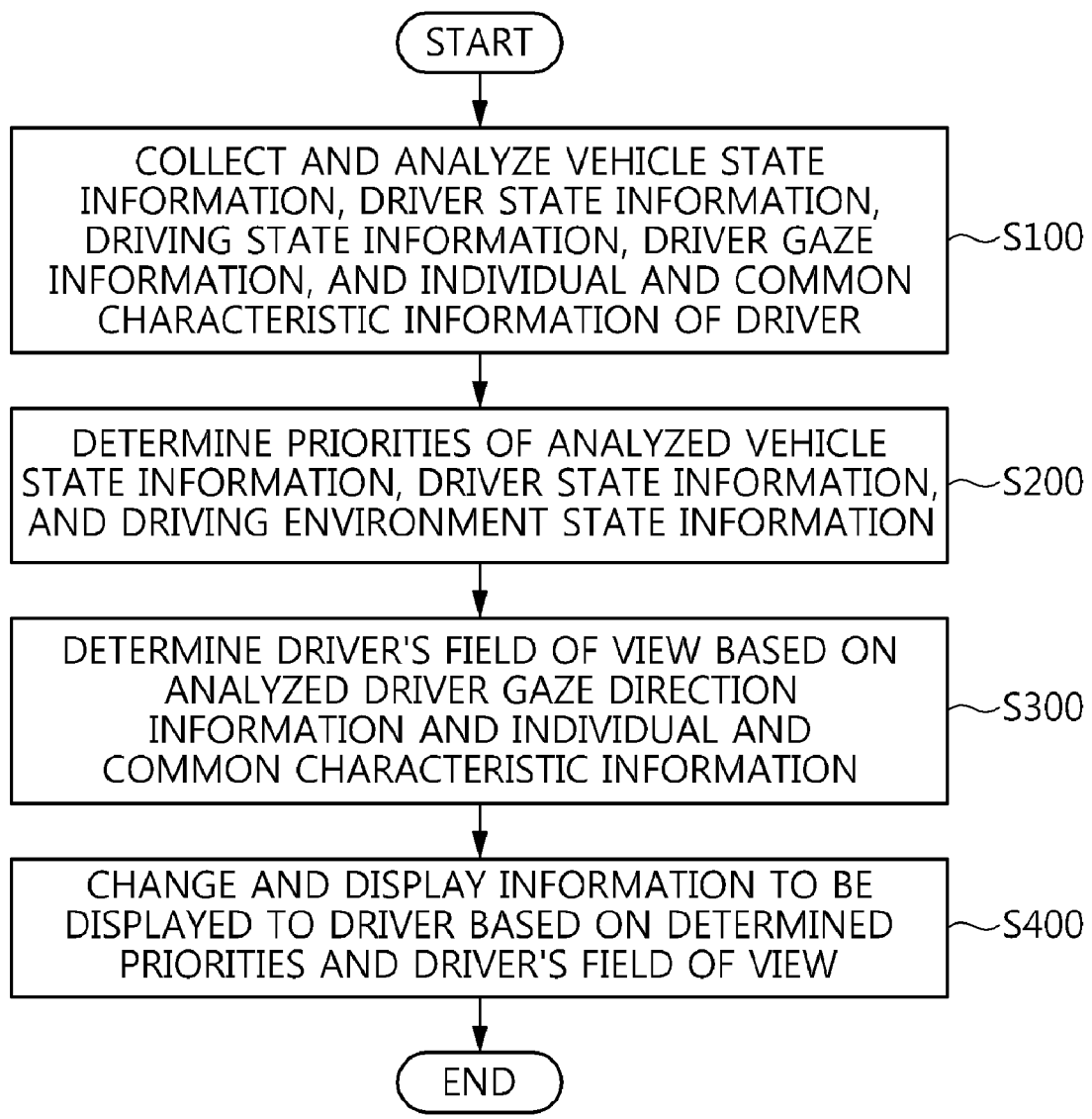
FIG. 7 is a diagram illustrating a head-up display method for a vehicle according to an embodiment of the present invention.

FIG. 7 is a diagram illustrating a head-up display method for a vehicle according to an embodiment of the present invention.

Referring to FIG. 7, the head-up display method for a vehicle according to the present invention is a method using the head-up display apparatus for a vehicle. In the following description, redundant descriptions will be omitted.

First, the information analysis unit 110 collects vehicle state information, driver state information, driving state information, driver gaze information, and driver individual and common characteristic information from a plurality of information collection modules attached to the vehicle in order to display the information in line with a driver's gaze and then analyzes the collected information at step S100.

Thereafter, the first information determination unit 130 prioritizes the analyzed vehicle state information, the driver state information and the driving environment state information at step S200. The first information determination unit 130 assigns priorities to the analyzed vehicle state information, the driver state information, and the driving environment state information based on a database constructed by previously examining the unique characteristics of the vehicle state information, the driver state information, and the driving environment state information. Thereafter, the first information determination unit 130 determines that information having a higher priority is more required by the driver based on the assigned priorities so that information can be displayed in descending order of priorities.

Thereafter, the second information determination unit 140 determines the driver's field of view based on the analyzed driver gaze direction information and the analyzed individual and common characteristic information at step S300. The second information determination unit 140 extracts driver degree of concentration information and driver focal range information, and then determines the driver's field of view. In this case, the driver's field of view is divided into a field of view being closely observed by the driver and an adjacent field of view.

Finally, the information display unit 150 changes information to be displayed to the driver based on the determined priorities and driver's field of view so that the driver can easily recognize the changed information, and displays the changed information at step S400. The information display unit 150 may set a recognition enhancement method for the information to be displayed to the driver based on the determined driver's field of view and priorities. That is, if the information to be displayed to the driver is information within the field of view being closely observed by the driver, the information display unit 150 sets the displayed information according to a representation method, such as a method of displaying figures or characters, so that the driver can easily recognize the displayed information. Meanwhile, if information to be displayed to the driver is information within the adjacent field of view of the driver, the information display unit 150 sets the information to be displayed according to a representation method, such as a method of generating a change in color, so that the driver can easily recognize the displayed information even without causing the driver to adjust the direction of his or her field of view. Furthermore, the information display unit 150 sets a method of prompting the driver to adjust the direction of his or her gaze based on the driver's field of view and the priorities of the information. That is, if the information to be displayed to the driver is not information within the field of view being closely observed by the driver, the information display unit 150 may set the information to be displayed according to a representation method, such as a method of generating an alarm or a visual change, in order to prompt the driver to adjust the direction of his or her gaze, and may display the information to the driver.

As described above, the head-up display apparatus and method for a vehicle according to the present invention divide a driver's field of view into a field of view and an adjacent field of view by taking the characteristics of a driver, driving circumstances, and various surrounding environments into consideration, analyze information collected within the two fields of view, and display the information to the driver in descending order of priorities. Accordingly, the driver can drive safely without failing to notice any information generated within the driver's field of view.

Furthermore, a driver's recognition ability can be improved because displayed information is represented in the form of figures, characters, or a change in color so that the driver can easily recognize the displayed information. Meanwhile, if information to be displayed occurs within the adjacent field of view of a driver, the displayed information may be represented in the form of an alarm or a visual change so that the driver is prompted to adjust his or her field of view. Accordingly, the driver can rapidly adjust his or her field of view.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A head-up display apparatus for a vehicle, comprising:
an information analysis unit configured to collect vehicle state information, driver state information, driving environment state information, driver gaze information, individual characteristic information and common characteristic information from a plurality of information collection units attached to the vehicle, and to analyze the collected information;
a first information determination unit configured to prioritize the vehicle state information, the driver state information, and the driving environment state information;
a second information determination unit configured to determine a driver's field of view based on driver field of view information and driver individual and common characteristic information; and an information display unit configured to change information to be displayed to the driver based on priorities and the driver's field of view, and to display the changed information.

2. The head-up display apparatus of claim 1, wherein the information analysis unit comprises:
a vehicle information collection unit configured to collect the vehicle state information;
a vehicle information analysis unit configured to analyze a position, direction, and speed of the vehicle based on the vehicle state information collected by the vehicle information collection unit;
a driver information collection unit configured to collect the driver state information;
a driver information analysis unit configured to analyze a behavior, degree of fatigue and degree of concentration of the driver based on the driver state information collected by the driver information collection unit;
a driving environment information collection unit configured to collect the driving environment state information;
a driving environment information analysis unit configured to analyze brightness, temperature, and presence or absence of an object near the vehicle based on the driving environment state information collected by the driving environment information collection unit;
a driver gaze information collection unit configured to collect the driver gaze information; and
a driver gaze information analysis unit configured to analyze a direction of the driver's head, a size and position of the driver's pupils, and a number of eye blinks based on the driver gaze information collected by the driver gaze information collection unit.

3. The head-up display apparatus of claim 1, wherein the information analysis unit comprises:
a driver individual characteristic information collection unit configured to collect the driver individual characteristic information;
a driver common characteristic information collection unit configured to collect the driver common characteristic information; and
a driver field of view analysis unit configured to analyze the driver's angle of view, the driver's visible distance, and the driver's cumulative gaze range by analyzing the driver individual and common characteristic information.

4. The head-up display apparatus of claim 3, wherein:
the driver individual characteristic information comprises any one of the driver's angle of view and the driver's faculty of vision; and
the driver common characteristic information comprises any one of age, gender, and driving experience of the driver.

5. The head-up display apparatus of claim 1, wherein the first information determination unit comprises:
a priority assignment unit configured to assign priorities to the vehicle state information, the driver state information, and the driving environment state information based on a previously constructed database; and
a priority determination unit configured to determine order in which information will be displayed in descending order of priorities.

6. The head-up display apparatus of claim 1, wherein the second information determination unit comprises:

a driver degree of concentration extraction unit configured to extract information about a degree of concentration of the driver based on the driver gaze information;
a driver focal range extraction unit configured to extract information about a focal range of the driver based on the driver individual and common characteristic information; and
a driver field of view determination unit configured to determine the driver's field of view based on the information about the degree of concentration of the driver and the information about the focal range of the driver.

7. The head-up display apparatus of claim 1, wherein the driver's field of view is divided into a field of view being closely observed by the driver and an adjacent field of view.

8. The head-up display apparatus of claim 1, wherein the information display unit comprises:
a recognition enhancement setting unit configured to configure information to be displayed to the driver according to a recognition enhancement method based on the priorities and the driver's field of view;
a recognition enhancement display unit configured to display the information to the driver while applying the recognition enhancement method employed by the recognition enhancement setting unit;
a gaze guidance setting unit configured to set a method of prompting a driver to adjust a direction of his or her gaze based on the priorities and the driver's field of view; and
a gaze guidance display unit configured to prompt the driver to adjust a direction of his or her gaze using the method of prompting the driver to adjust the direction of his or her gaze set by the gaze guidance setting unit, and to then display the information to the driver.

9. The head-up display apparatus of claim 8, wherein the recognition enhancement method changes any one of a color, form, size, format and degree of transparency of the information to be displayed.

10. The head-up display apparatus of claim 8, wherein the method of prompting the driver to adjust the direction of his/her gaze changes any one of an alarm, a size, and a degree of transparency, thereby prompting the driver to adjust the driver's field of view.

11. A head-up display method for a vehicle, comprising:
collecting, by an information analysis unit, vehicle state information, driver state information, driving environment state information, driver gaze information, individual characteristic information and common characteristic information from a plurality of information collection units attached to the vehicle, and analyzing, by an information analysis unit, the collected information;
prioritizing, by a first information determination unit, the vehicle state information, the driver state information, and the driving environment state information;
determining, by a second information determination unit, a driver's field of view based on driver field of view information and individual and common characteristic information; and
changing, by an information display unit, information to be displayed to the driver based on the priorities and the driver's field of view, and displaying, by an information display unit, the changed information.

12. The head-up display method of claim 11, wherein collecting and analyzing the information comprises:
collecting the vehicle state information, and analyzing a position, direction, and speed of the vehicle based on the vehicle state information;

collecting the driver state information, and analyzing behavior, degree of fatigue, and degree of concentration of the driver based on the driver state information;

collecting the driving environment state information, and analyzing brightness, temperature, and presence or absence of an object near the vehicle based on the driving environment state information;

collecting the driver gaze information, and analyzing a direction of the driver's head, a size and position of the driver's pupils, and a number of eye blinks based on the driver gaze information; and collecting the driver individual and common characteristic information, and analyzing the driver's angle of view, the driver's visible distance, and the driver's cumulative gaze range by analyzing the driver individual and common characteristic information.

13. The head-up display method of claim 11, wherein prioritizing comprises assigning the priorities to the vehicle state information, the driver state information, and the driving environment state information based on a previously constructed database, and determining order in which information will be displayed in descending order of priorities.

14. The head-up display method of claim 11, wherein determining the driver's field of view comprises extracting information about the degree of concentration of the driver based on the driver gaze information, extracting information about a focal range of the driver based on the driver individual and common characteristic information, and determining the driver's field of view based on the information about the degree of concentration of the driver and the information about the focal range of the driver.

15. The head-up display method of claim 11, wherein the driver's field of view is divided into a field of view being closely observed by the driver and an adjacent field of view.

16. The head-up display method of claim 11, wherein changing and displaying the information comprises:

displaying information to the driver while applying a recognition enhancement method to the information to be displayed based on the priorities and the driver's field of view; and prompting the driver to adjust a direction of his/her gaze by applying a method of prompting the driver to adjust the direction of the driver's gaze based on the priorities and the driver's field of view, and then displaying the information to the driver.

* * * * *